United States Patent [19]

Ellgen et al.

[11] Patent Number: 5,766,569

[45] Date of Patent: *Jun. 16, 1998

[54] LITHIUM MANGANESE OXIDE COMPOUND AND METHOD OF PREPARATION

[75] Inventors: Paul C. Ellgen, Oklahoma City; Terrell N. Andersen, Edmond, both of Okla.

[73] Assignee: Kerr-McGee Chemical Corporation, Oklahoma City, Okla.

[*] Notice: The term of this patent shall not extend beyond the expiration date of Pat. No. 5,641,468.

[21] Appl. No.: 587,438

[22] Filed: Jan. 17, 1996

Related U.S. Application Data

[63] Continuation-in-part of Ser. No. 524,859, Sep. 7, 1995.

[51] Int. Cl.$^6$ .................................................. C01G 45/12
[52] U.S. Cl. .................................................. 423/599; 429/224
[58] Field of Search .................................. 423/599, 224

[56] References Cited

U.S. PATENT DOCUMENTS

| | | | |
|---|---|---|---|
| 5,266,299 | 11/1993 | Tarascon | 423/599 |
| 5,370,710 | 12/1994 | Nagaura et al. | 423/599 |
| 5,449,577 | 9/1995 | Dahn et al. | 423/599 |

*Primary Examiner*—Wayne Langel
*Attorney, Agent, or Firm*—Herbert M. Hanegan; J. Rodgers Lunsford, III

[57] ABSTRACT

A method for manufacturing $Li_{1+x}Mn_2O_4$ comprising the steps of providing $LiMn_2O_4$ or $\beta$-$MnO_2$; providing a source of lithium; dissolving lithium from the lithium source in a liquid medium in which lithium generates solvated electrons or the reduced form of an electron-transfer catalyst; and contacting the $LiMn_2O_4$ or $\beta$-$MnO_2$ with the liquid medium containing the dissolved lithium and the solvated electrons or the reduced form of the electron-transfer catalyst.

31 Claims, 4 Drawing Sheets

LITHIUM MANGANESE OXIDE COMPOUND AND METHOD OF PREPARATION

CROSS-REFERENCE TO RELATED APPLICATION

This is a continuation-in-part of co-pending application Ser. No. 08/524,859, filed Sep. 7, 1995, pending.

FIELD OF THE INVENTION

The present invention relates to a lithium manganese oxide compound and its production by contacting $LiMn_2O_4$ or $\beta\text{-}MnO_2$ with lithium dissolved in a solvent in which lithium generates solvated electrons or in which a catalyst is present that is capable of accepting an electron from lithium and delivering it to the $LiMn_2O_4$ or $\beta\text{-}MnO_2$.

BACKGROUND OF THE INVENTION

The present invention relates to lithiated manganese oxides, to methods of making such materials and to the use of such materials in the manufacture of battery cathodes and electrodes for other purposes such as in electrochemical cells.

More particularly it relates to a process for the manufacture of $Li_{1+x}Mn_2O_4$ and the use of $Li_{1+x}Mn_2O_4$ in electrical storage batteries. Still more particularly, it relates to a process for the manufacture of $Li_{1+x}Mn_2O_4$ by the reaction of $LiMn_2O_4$ or $\beta\text{-}MnO_2$ with lithium and to using $Li_{1+x}O_4$ in the manufacturing of the cathode component of rechargeable lithium-ion electrical storage batteries.

Conventionally used nonaqueous electrolyte cells are primary cells which can be used only once. With recent widespread use of video cameras and small-sized audio instruments, there has been an increased need for secondary cells which can be used conveniently and economically over many charge-discharge cycles.

Lithium cells useful as electrical storage batteries incorporate a metallic lithium anode and a cathode including an active material which can take up lithium ions. An electrolyte incorporating lithium ions is disposed in contact with the anode and the cathode. During discharge of the cells, lithium ions leave the anode, enter the electrolyte and are taken up in the active material of the cathode, resulting in release of electrical energy. Provided that the reaction between the lithium ions and the cathode active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as secondary cells. It has long been known that useful cells can be made with a lithium metal anode and a cathode-active material which is a sulfide or oxide of a transition metal, i.e., a metal capable of assuming plural different valence states. Dampier, "The Cathodic Behavior of CuS, $MoO_3$, and $MnO_2$ in Lithium Cells," *J Electrochem. Soc.*, Vol. 121, No. 5, pp. 656–660 (1974) teaches that a cell incorporating a lithium anode and manganese dioxide cathode-active material can be used as an electrical power source. The same reference further teaches that a lithium and manganese dioxide cell can serve as a secondary battery.

There has been considerable effort in the battery field directed towards development of cathode materials based on lithium manganese oxides. Both lithium and manganese dioxide are relatively inexpensive, readily obtainable materials, offering the promise of a useful, potent battery at low cost. Nonaqueous electrolyte primary cells using lithium as a negative electrode-active material and nonaqueous solvent such as an organic solvent as an electrolyte have advantages in that self-discharge is low, nominal potential is high and storability is excellent. Typical examples of such nonaqueous electrolyte cells include lithium manganese dioxide primary cells which are widely used as current sources for clocks and memory backup of electronic instruments because of their long-term reliability.

Secondary lithium batteries using an intercalation compound as cathode and free lithium metal as anode have been studied intensively due to their potential technological significance. Unfortunately, these studies revealed inherent dangers associated with the use of free lithium and discouraged the use of such batteries in general consumer applications. Upon repeated cycling, dendritic growth of lithium occurs at the lithium electrode. Growth of lithium dendrites can lead eventually to an internal short-circuit in the cell with a subsequent hazardous uncontrolled release of the cell's stored energy.

One approach to improving the reversibility of lithium-based anodes involves the use of lithium intercalation compounds. The intercalation compound serves as a host structure for lithium ions which are either stored or released depending on the polarity of an externally applied potential. During discharge the electromotive force reverses the forced intercalation thereby producing current.

Batteries using this approach, in which an intercalation compound is used as the anode instead of free lithium metal, are known in the art as "lithium-ion" or "rocking-chair" batteries and are described in detail in the recent review paper, "The $Li_{1+x}Mn_2O_4/C$ Rocking-chair System," J. M. Tarascon and D. Guyomard, *Electrochimica Acta*, Vol. 38, No. 9, pp. 1221–1231 (1993).

Lithium-ion cells provide less energy density than lithium metal cells, because of the added mass associated with the lithium intercalation host at the negative electrode. Therefore, to compensate for this mass penalty, strongly oxidizing materials are chosen for the positive electrode, which reversibly intercalate lithium at a potential of ~4V vs. the lithium electrode. Only three Li-based compounds currently satisfy this requirement, $LiNiO_2$, $LiCoO_2$ and $LiMn_2O_4$. Also, a negative electrode is chosen that intercalates and deintercalates lithium at as negative a potential as possible. Carbonaceous materials are most suitable in this respect, as they intercalate and deintercalate lithium at a potential very close to that of metallic lithium. The three metal oxides identified above are not moisture sensitive and can be handled in air, as is the case with carbon. Thus, these cells are assembled in the discharged state.

Lithium-ion cells with $LiCoO_2$ as the positive electrode are now a commercial product. Such cells with $LiMn_2O_4$ (spinel) substituted for the $LiCoO_2$ are considered promising because manganese is more available and less costly than cobalt, and is environmentally more friendly. Upon the first charge of a $LiMn_2O_4$ cell, the $LiMn_2O_4$ loses most of its lithium, being converted nominally to $\lambda\text{-}MnO_2$. Simultaneously, the carbon negative electrode intercalates the lithium given up by the spinel. The capacity of the cell is limited, among other things, by the amount of charge associated with the loss of 1.0 mole of lithium for each mole of $LiMn_2O_4$ or 2 moles of Mn. Thus, the cell passes a theoretical maximum charge of 148 mAh per gram of $LiMn_2O_4$. The actual charge passage is somewhat less than theoretical because $LiMn_2O_4$ is not usually driven all the way to λ-MnO$_2$. Nevertheless, a cell with LiMn$_2$O$_4$ providing most of 148 mAh/g and 4V is a very competitive cell, providing energy densities on both weight and volume bases that are two or more times greater than cells employing state-of-the-art chemistries—i.e., nickel-cadmium and nickel metal-hydride.

However, carbon/metal oxide cells as described above have a significant disadvantage in that the cell capacity decreases after the first charging because some of the lithium intercalated into the carbonaceous materials used as the negative electrode cannot be deintercalated upon discharge. In practice, either carbon or graphite irreversibly consumes a portion of the lithium during the first charge half-cycle. As a result the capacity of the electrochemical cell is decreased in proportion to the lithium that is irreversibly intercalated into the carbon during the first charge.

This disadvantage can be minimized by using Li$_{1+x}$Mn$_2$O$_4$ as all or part of the cathode. One may assume that x can have values between 0 and 1, based on results of reducing LiMn$_2$O$_4$ either electrochemically (T. Ohzuku, M. Kitagawa and T. Hirai, J. Electrochem. Soc., Vol. 137, pp. 769–775, 1990) or chemically with butyl lithium (A. Mosbah, A. Verbaere and M. Tournoux, Mat. Res. Bull., Vol. 18, pp. 1375–1381, 1983; M. M. Thackeray, W. I. F. David, P. G. Bruce and J. B. Goodenough, Mat. Res. Bull., Vol. 18, pp. 461–472, 1983) or lithium iodide (J. M. Tarascon and D. Guyomard, J. Electrochem. Soc., Vol. 138, pp. 2864–2868, 1991). Since the lithium irreversibly intercalated in the carbon is well less than half the amount totally intercalated, x may be chosen to balance the lithium irreversibly intercalated by the carbon. Then, upon the first charge of the cell so manufactured, the Li$_{1+Mn2}$O$_4$ is converted to λ-MnO$_2$. Subsequent discharge cycles of the cell convert λ-MnO$_2$ to LiMn$_2$O$_4$, and charge cycles convert LiMn$_2$O$_4$ to λ-MnO$_2$.

The x moles of lithium irreversibly intercalated per 2 moles of Mn are provided by an additional x moles of lithium atoms in the Li$_{1+x}$Mn$_2$O$_4$. If, rather, LiMn$_2$O$_4$ were used as the beginning positive electrode material, the same x moles of lithium irreversibly intercalated would require x moles of LiMn$_2$O$_4$. Since the weight ratio of Li/LiMn$_2$O$_4$ is 6.94/180.82 or 0.038, the cells manufactured using Li$_{1+x}$Mn$_2$O$_4$ clearly have greater electrical capacity per unit weight and volume than those with LiMn$_2$O$_4$.

If x in Li$_{1+x}$Mn$_2$O$_4$ were greater than the moles of lithium irreversibly intercalated in the carbon, then, after charging the Li$_{1+x}$Mn$_2$O$_4$ to λ-MnO$_2$, the λ-MnO$_2$ could be discharged to Li$_{1+y}$Mn$_2$O$_4$, where y is a fraction between zero and x. The additional discharge beyond LiMn$_2$O$_4$ (i.e., y moles of lithium per 2 moles Mn) would provide extra capacity, but this discharge occurs at only about 3V rather than about 4V. More disconcerting, however, is the fact that the capacity at 3V decreases very rapidly with repetitive cycling and, consequently, is not very useful. Thus, the proper cell balance based on state-of-the art spinels is to equate x with the moles of lithium irreversibly intercalated in the carbon.

The materials LiMn$_2$O$_4$, Li$_{1+x}$Mn$_2$O$_4$ and Li$_2$Mn$_2$O$_4$, which are relevant to this are known in the art. Depending upon methods of preparation, their stoichiometries can differ slightly from the ideal. LiMn$_2$O$_4$ and Li$_2$Mn$_2$O$_4$ are chemical compounds, which are precisely identified by their X-ray powder diffraction patterns, given on cards 35–781 and 38–299, respectively, of the Powder Diffraction File published by the International Centre for Diffraction Data, Newtown Square Corporate Campus, 12 Campus Boulevard, Downtown Square, Penn., 19073-3273, U.S.A. Li$_{1+x}$Mn$_2$O$_4$ is a two phase mixture of LiMn$_2$O$_4$ and Li$_2$Mn$_2$O$_4$ (M. M. Thackeray, W. I. F. David, P. G. Bruce and J. B. Goodenough, Mat. Res. Bull., Vol. 18, pp. 461–472 (1983); and T. Ohzuku, M. Kitagawa and T. Hirai, J. Electrochem. Soc., Vol. 137, pp. 769–775 (1990)). The composition of Li$_{1+x}$Mn$_2$O$_4$ is manifest in both the chemical analysis and in the relative size of the X-ray peaks of the end members.

LiMn$_2$O$_4$ can be prepared from a wide range of lithium sources and a wide range of manganese sources under a wide range of conditions. U.S. Pat. No. 5,135,732 discloses a method for the low temperature preparation of LiMn$_2$O$_4$. LiMn$_2$O$_4$ is one of the raw materials of the present invention.

In contrast, Li$_2$Mn$_2$O$_4$ and Li$_{1+x}$Mn$_2$O$_4$ are more difficult to prepare and in fact, known methods for their preparation are excessively costly. These methods include the electrochemical intercalation of lithium into LiMn$_2$O$_4$ (W. Li, W. R. McKinnon, and J. R. Dahn, J Electrochem. Soc., Vol. 141, No. 9, pp. 2310–2316, 1994), the reaction of LiMn$_2$O$_4$ with lithium iodide (U.S. Pat No. 5,266,299), and the reaction of LiMn$_2$O$_4$ with butyl lithium (M. M. Thackeray, W. I. F. David, P. G. Bruce, J. B. Goodenough, Mat. Res. Bull., Vol 18, pp. 461–472 (1983)).

U.S. Pat. No. 5,196,279 teaches the synthesis of Li$_{1+x}$Mn$_2$O$_4$ from LiI and either LiMn$_2$O$_4$ or λ-MnO$_2$. The reaction is effected by heating mixtures of the solid reactants to 150° C. in sealed ampoules. Li$_{1+x}$Mn$_2$O$_4$ is a mixture of Li$_2$Mn$_2$O$_4$ and LiMn$_2$O$_4$.

U.S. Pat. No. 5,240,794 discloses a variety of lithium and lithium-ion batteries. These include a range of lithium manganese oxide compositions, including the composition Li$_{1+x}$Mn$_2$O$_4$. The patent discloses preparative methods for this composition generally involving mixing precursor lithium compounds and manganese compounds. The mixtures are then heated at elevated temperatures (typically 300° C.) in a reducing atmosphere (typically hydrogen gas) for several hours (typically 24 hours).

SUMMARY OF THE INVENTION

It is an object of the present invention to provide a nonaqueous electrolyte secondary cell having an increased cell capacity which comprises a negative electrode consisting essentially of a carrier for a negative electrode active material and a positive electrode comprising a lithium manganese oxide as an essential positive electrode active material.

In accordance with the present invention, the above object can be accomplished by Li$_{1+x}$Mn$_2$O$_4$ prepared by contacting LiMn$_2$O$_4$ or β-MnO$_2$ with lithium suspended or dissolved in a solvent in which lithium generates solvated electrons or in which a catalyst is present that is capable of accepting an electron from lithium and delivering it to the LiMn$_2$O$_4$ or β-MnO$_2$ reactant.

DESCRIPTION OF THE PREFERRED EMBODIMENT

Figure 1:
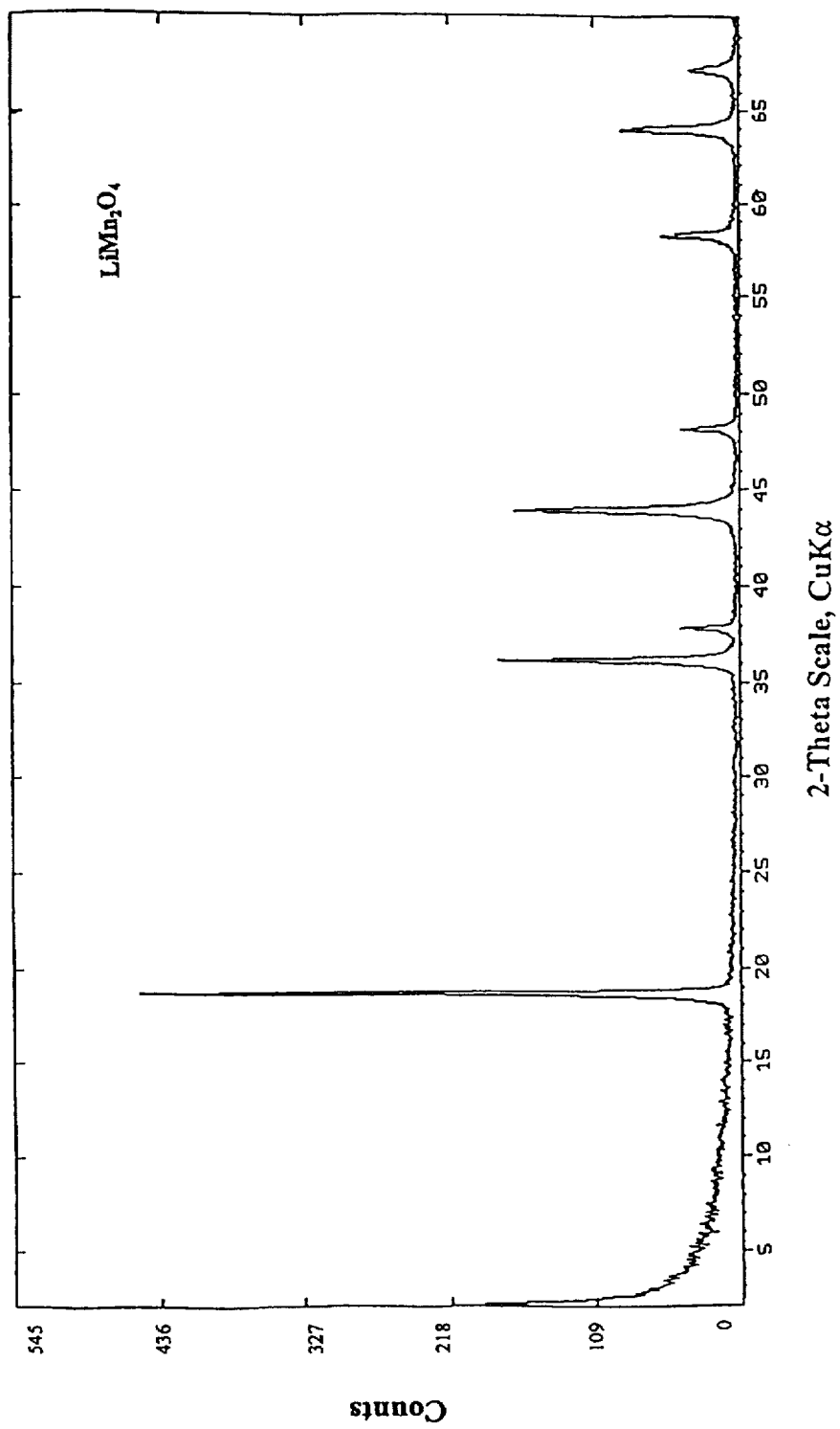
FIG. 1 is an X-ray scan of LiMn$_2$O$_4$.

As noted above, this invention is directed to a method of manufacturing Li$_{1+x}$Mn$_2$O$_4$ where x is from about 0.01 to about 0.9. Specifically such method is accomplished by providing LiMn$_2$O$_4$ or β-MnO$_2$, a source of lithium, dissolving lithium from the lithium source in a liquid medium in which lithium generates solvated electrons or the reduced form of an electron-transfer catalyst and contacting the LiMn$_2$O$_4$ or β-MnO$_2$ with the lithium-containing liquid medium.

The source of lithium can be any source which makes elemental lithium available for reaction.

In accordance with the present invention lithium is dissolved by a solvent in which lithium generates solvated electrons or the reduced form of an electron-transfer catalyst and contacting the LiMn$_2$O$_4$ or β-MnO$_2$ with the dissolved lithium. Advantageously the solvent is selected from the group consisting of ammonia, organic amines, ethers, pyridine, substituted pyridines, mixtures of ammonia and amines, and mixtures of ammonia and ethers. Preferably the solvent is ammonia, organic amines, or pyridines. When the solvent is ammonia the contacting step is advantageously carried out at a temperature of from about minus 30° C. to about minus 50° C. Preferably the temperature during the contacting step is maintained at from about minus 33° C. to about minus 45° C. When ammonia is the solvent it is preferred that it be in liquid form.

Optionally the liquid medium of the present invention can be a solvent having an electron transfer catalyst dissolved therein. The liquid medium may also be a mixture of compounds which is a liquid at the reaction temperature. Advantageously when such a liquid medium is employed, a catalyst selected from the group consisting of sulfur, sulfides, reducible sulfur compounds, iodine, iodides, reducible iodine compounds, pyridine, pyridine derivatives, and benzophenone is added to the liquid medium.

If the solvent used in the method of this invention is an organic amine, it is advantageously selected from the group consisting of methylamines, ethylamines, propylamines, and butylamines. Advantageously, the method of this invention is carried out wherein the organic amine is a liquid. Preferably the contacting step of the present method is carried out at a temperature of from about minus 25° C. to about 100° C. Preferably the contacting step is carried out from a temperature of from about 20° C. to about 90° C.

If the solvent used in the method of this invention is a pyridine or a substituted pyridine, the contacting step is advantageously carried out at a temperature from about minus 5° C. to about 190° C. Preferably when using pyridine or a substituted pyridine as the solvent the contacting step is carried out at a temperature of from about 30° C. to about 165° C.

As discussed above, the use for which the Li$_{1+x}$Mn$_2$O$_4$ prepared by the method of this invention is uniquely applicable is as a cathode for use in a secondary lithium ion electrochemical cell. Such a cell may be of known design having a lithium intercalation anode, a suitable nonaqueous electrolyte, a cathode of material made by the method of this invention, and a separator between the anode and the cathode. The anode may be of known materials such as transition metal oxides, transition metal sulfides and carbonaceous materials. The nonaqueous electrolyte can be in the form of a liquid, a gel or a solid matrix that contains mobile lithium ions.

The process of the present invention can optionally be practiced by providing an electron-transfer catalyst to the suspension of LiMn$_2$O$_4$ or β-MnO$_2$ before or after the addition of lithium. Advantageously, the catalyst is selected from the group consisting of sulfur, sulfides, reducible sulfur compounds, iodine, iodides, reducible iodine compounds, pyridine, pyridine derivatives, and benzophenone.

Analysis of the products of this invention relies on X-ray diffraction, which is supplemented by chemical analyses (percent Li and Mn, and Mn oxidation number). The relationship between the chemical analyses and the stoichiometry/formula of the reaction product are readily derivable from chemical principals.

Figure 2:
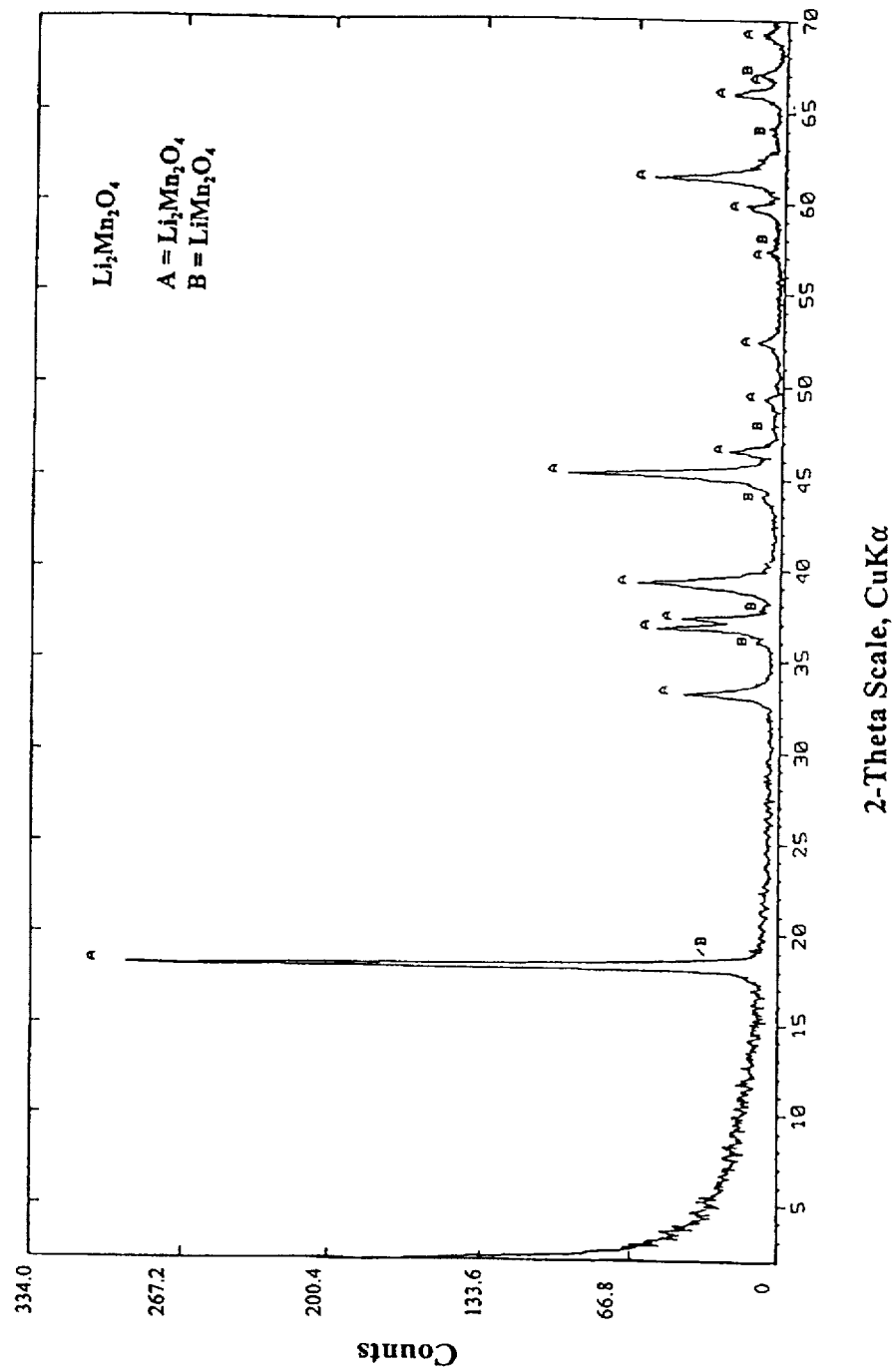
FIG. 2 is an X-ray scan of Li$_2$Mn$_2$O$_4$.

X-ray diffraction identifies the x in Li$_{1+x}$Mn$_2$O$_4$ from the relative sizes/heights of the LiMn$_2$O$_4$ and Li$_2$Mn$_2$O$_4$ peaks in the X-ray scan. Typical X-ray patterns for the samples of LiMn$_2$O$_4$ and Li$_2$M$_2$O$_4$ involved in the present work are shown in FIGS. 1 and 2, respectively. The pattern for LiMn$_2$O$_4$ is clean while that for Li$_2$Mn$_2$O$_4$ contains tiny peaks for LiMn$_2$O$_4$ as well as the major peaks for Li$_2$Mn$_2$O$_4$. The Li$_2$Mn$_2$O$_4$ peaks are labeled "A" and the LiMn$_2$O$_4$ peaks are labeled "B." The LiMn$_2$O$_4$ peaks arise from inadvertent contact between the Li$_2$Mn$_2$O$_4$ sample and the laboratory atmosphere during the X-ray determination. This contact causes oxidation of Li$_2$Mn$_2$O$_4$ at the surface of the powdered product to form LiMn$_2$O$_4$ according to the following reaction:

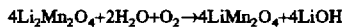

$$4Li_2Mn_2O_4 + 2H_2O + O_2 \rightarrow 4LiMn_2O_4 + 4LiOH$$

This reaction does not occur unless both O$_2$ (from the air) and moisture are present. Stringent measures were taken to minimize the product-air contact; i.e., a hydrocarbon oil (3-in-1 Household Oil™) was mixed with the sample before the X-ray plaque was pressed, and the sample plaques were prepared in an inert atmosphere. Correspondingly, the conversion was slow and, thus, of small magnitude.

The relative amounts of LiMn$_2$O$_4$ and Li$_2$Mn$_2$O$_4$ present in the products were estimated from the relative heights of the tallest X-ray peaks. These are seen to be located at 18.6° and 18.4°, respectively. Then, from simple ratioing, the relative amounts of LiMn$_2$O$_4$ and Li$_2$Mn$_2$O$_4$ were converted to a composite formula for the product. Conversion of Li$_2$Mn$_2$O$_4$ to LiMn$_2$O$_4$ in the product was neglected in the analysis of the peaks.

EXAMPLE 1

Example 1 synthesized LiMn$_2$O$_4$ as a reactant for synthesizing Li$_2$Mn$_2$O$_4$ (Example 2) and Li$_{1+x}$Mn$_2$O$_4$ (Examples 3 and 4).

Lithium hydroxide (technical grade LiOH.H$_2$O) and MnO$_2$ (electrolytic manganese dioxide, "HSA Grade," Kerr-McGee Chemical Corporation) were weighed out in the ratio of 1 mol LiOH—H$_2$O to 2 mol MnO$_2$ and blended together in a laboratory ball mill. Then the mixture was heated in a muffle furnace at 725° C. for 18 hours and cooled to room temperature. The X-ray scan of this product is shown in FIG. 1.

EXAMPLE 2

Example 2 synthesized Li$_2$Mn$_2$O$_4$ as an X-ray standard for evaluation of products in Examples 3 and 4.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. LiMn$_2$O$_4$ (77.16 g, 427 millimoles) was charged to the flask and covered with 200 ml pyridine. In a dry box, 2.96 g (427 millimoles) of lithium foil was cut into 1 cm$^2$ pieces and charged to a Schlenk tube. The lithium was transferred to the round-bottom flask by using a T-shaped adapter and a counterflow of argon to shield both the lithium and the $LiMn_2O_4$ suspension from contact with air. Lithium addition required about 5 minutes and readjustment of the overhead stirrer required about 25 minutes; over this period, no reaction was observed. Stirring was begun, and the suspension was heated using an electric mantle. Thereafter, the temperature increased to the boiling point (about 115° C.) within about 5 minutes; to control the reflux rate, it was necessary to remove the heating mantle and cool the reaction flask with an ice bath. After about 10 minutes at reflux, no unreacted lithium was visible. Thereafter, the suspension was refluxed for an additional hour. The suspended solids were brown, the color of $Li_2Mn_2O_4$ ($LiMn_2O_4$ is black).

After cooling to ambient temperature, the brown product was recovered by filtration in an argon atmosphere. The recovered solids were washed on the frit with three 50-ml portions of tetrahydrofuran, superficially dried on the frit, and transferred to a Schlenk tube. Solvent was removed by evacuation in an oil-pump vacuum with intermittent heating using a hot-air gun. The product was analyzed by X-ray diffraction, the scan being shown in FIG. 2. As judged by the relative heights of the principal peaks, the recovered solids were about 92% $Li_2Mn_2O_4$ and 8% $LiMn_4$. The $LiMn_2O_4$ probably formed on the surface of the product as it sat on the X-ray plaque, as evidenced by the following chemical analysis.

Chemical analysis indicated 7.1% Li, 55.8% Mn, 49.0% $MnO_2$, 0.85% C, 0.22% H, and 0.18% N. From the chemical analysis, the mole ratio (Li)/(Mn)=1.001. The calculated Mn oxidation number, given by $[2+2(54.94)(\% MnO_2)/86.94(\% Mn)]$, is 3.11. For $Li_2Mn_2O_4$, the theoretical mole ratio (Li)/(Mn)=1.00 and the theoretical Mn oxidation number= 3.00. Thus, the product corresponds chemically to $Li_2Mn_2O_4$ with a small fraction of organic contaminant from the solvent.

EXAMPLE 3

Example 3 demonstrated that $Li_{1.3}Mn_2O_4$ was formed in the reaction of elemental lithium with $LiMn_2O_4$, in the molar ratio of $Li/LiMn_2O_4=0.30/1.00$, in liquid pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (100.78 g, 557 millimoles) was charged to the flask and covered with 200 ml pyridine. In a dry box, 1.16 g (167 millimoles) of lithium foil was cut into 1 cm² pieces and charged to a Schlenk tube. The lithium was transferred to the round-bottom flask by using a T-shaped adapter and a counterflow of argon to shield both the lithium and the $LiMn_2O_4$ suspension from contact with air. Stirring was begun, and the suspension was heated using an electric mantle. The temperature increased to the boiling point (about 115° C.) within about 20 minutes. After about 5 minutes at reflux, the suspended solids were brown, and no unreacted lithium was visible. Thereafter, the suspension was refluxed for an additional 40 minutes.

Figure 3:
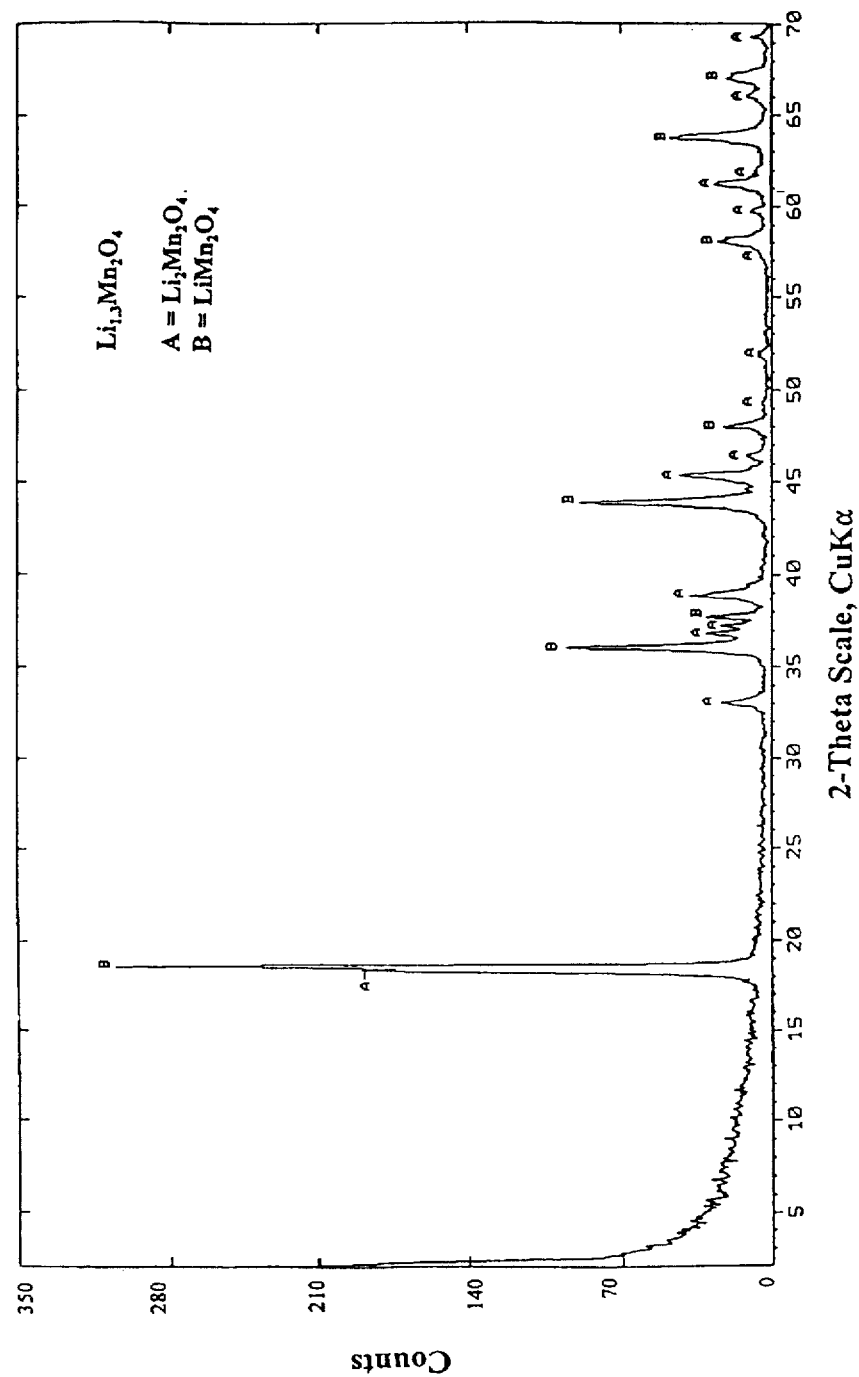
FIG. 3 is an X-ray scan of Li$_{1.3}$Mn$_2$O$_4$.

The product was recovered by filtration in air, washed on frit with three 50-ml portions of THF, superficially dried on the frit, and transferred to a Schlenk tube. Solvent was removed by evacuation in an oil-pump vacuum with intermittent heating using a hot-air gun. The product was analyzed by X-ray diffraction (see FIG. 3). As judged by the relative heights of the principal peaks, the recovered solids were about 35% $Li_2Mn_2O_4$ and about 65% unreacted $LiMn_2O_4$, which corresponds to a product of $Li_{1.35}Mn_2O_4$. Chemical analysis found 4.8% Li, 64.5% $MnO_2$ and 58.9% Mn, which gives a Li/Mn mole ratio of 0.645 and a Mn oxidation number of 3.38. For $Li_{1.3}Mn_2O_4$, the theoretical Li/Mn mole ratio is 0.65 and the theoretical oxidation number is 3.35.

EXAMPLE 4

Example 4 confirmed that $Li_{1.6}Mn_2O_4$ was formed in the reaction of elemental lithium with $LiMn_2O_4$ in the molar ratio of $Li/LiMn_2O_4=0.60/1.00$, in liquid pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (100.83 g, 558 millimoles) was charged to the flask and covered with 200 ml pyridine. In a dry box, 2.321 g (334 millimoles) of lithium foil was cut into 1 cm² pieces and charged to a Schlenk tube. The lithium was transferred to the round-bottom flask by using a T-shaped adapter and a counterflow of argon to shield both the lithium and the $LiMn_2O_4$ suspension from contact with air. Stirring was begun, and the suspension was heated using an electric mantle. The temperature increased to the boiling point (about 115° C.) within about 6 minutes. After about 15 minutes at reflux, the suspended solids were brown, and only a small quantity of unreacted lithium was visible. Thereafter, the suspension was refluxed for an additional hour.

Figure 4:
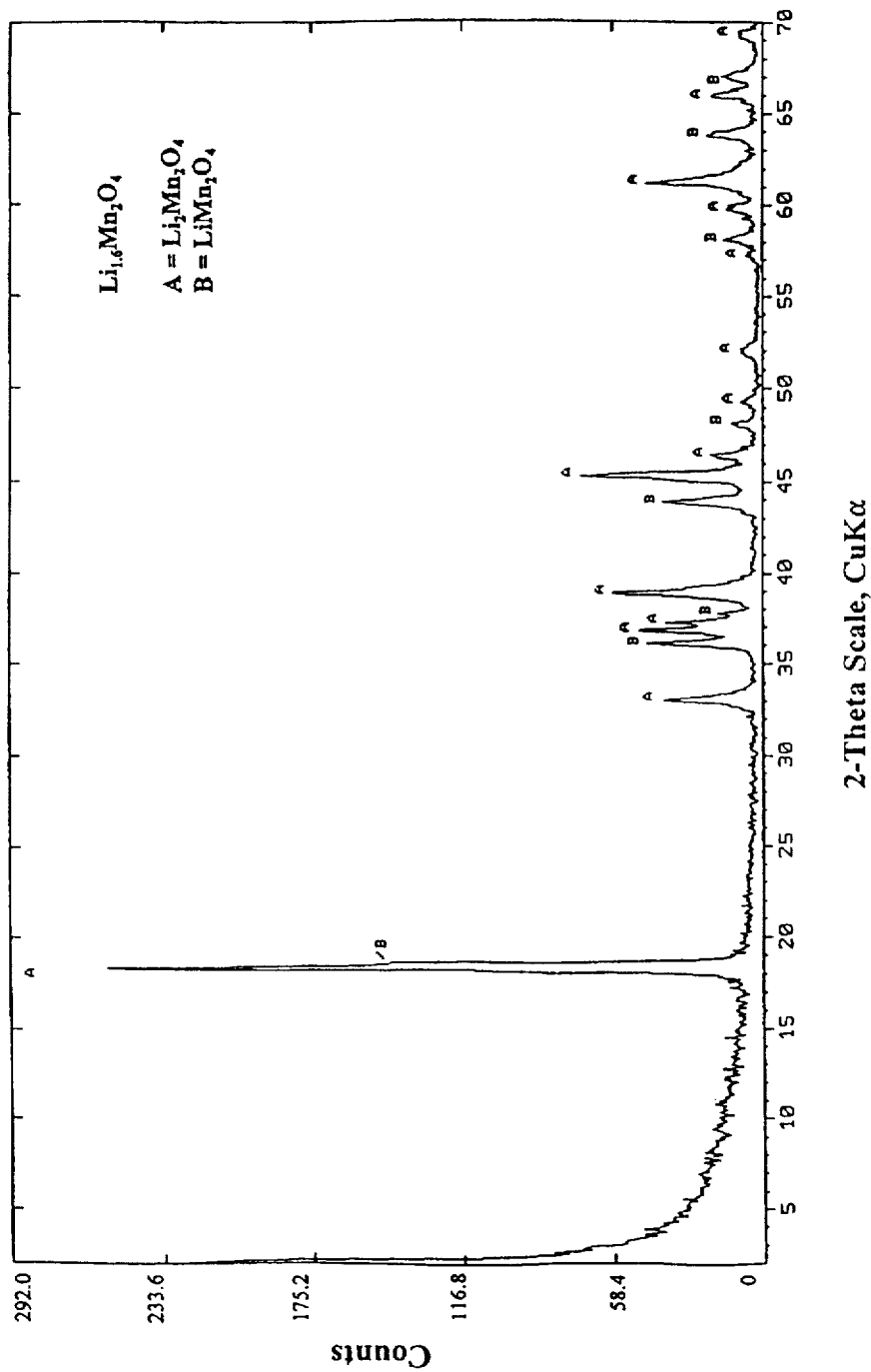
FIG. 4 is an X-ray scan of Li$_{1.6}$Mn$_2$O$_4$.

The product was recovered by filtration in air, washed on frit with two 50-ml portions of THF, superficially dried on the frit, and transferred to a Schlenk tube. Solvent was removed by evacuation in an oil-pump vacuum with intermittent heating using a hot-air gun. The product was analyzed by X-ray diffraction (see FIG. 4). As judged by the relative heights of the principal peaks, the recovered solids were about 65% $Li_2Mn_2O_4$ and about 35% unreacted $LiMn_2O_4$ which corresponds to a product of $Li_{1.65}Mn_2O_4$. Chemical analysis found 5.8% Li, 55.9% $MnO_2$ and 57.9%, which gives a Li/Mn mole ratio of 0.79 and a Mn oxidation number of 3.22. For $Li_{1.6}Mn_2O_4$, the theoretical Li/Mn mole ratio is 0.80 and the theoretical Mn oxidation number is 3.20.

What is claimed is:

1. A method for manufacturing $Li_{1+x}Mn_2O_4$ comprising the steps of:
   (a) Providing $LiMn_2O_4$ or $\beta$-$MnO_2$;
   (b) Providing a source of elemental lithium;
   (c) Providing a liquid medium in which elemental lithium generates solvated electrons or the reduced form of an electron-transfer catalyst;
   (d) Dissolving the elemental lithium in the liquid medium;
   (e) Contacting the $LiMn_2O_4$ or $\beta$-$MnO_2$ with the liquid medium containing the dissolved elemental lithium and the solvated electrons or the reduced form of the electron-transfer catalyst;
   (f) Reacting the $LiMn_2O_4$ or $\beta$-$MnO_2$ with the dissolved elemental lithium to produce $Li_{1+x}Mn_2O_4$ product; and
   (g) Separating the $Li_{1+x}Mn_2O_4$ product formed in Step (f) from the liquid medium;
   wherein x is from about 0.01 to about 0.9.

2. The method of claim 1 wherein the liquid medium is selected from the group consisting of ammonia, organic amines, ethers, pyridine, substituted pyridines, mixtures of ammonia and amines, and mixtures of ammonia and ethers.

3. The method of claim 2 wherein the liquid medium is ammonia.

4. The method of claim 3 wherein the temperature during the contacting step is maintained at from about minus 30° C. to about minus 50° C.

5. The method of claim 4 wherein the temperature during the contacting step is maintained at from about minus 33° C. to about minus 45° C.

6. The method of claim 2 wherein the liquid medium is an organic amine.

7. The method of claim 6 wherein the contacting step is carried out at a temperature of from about minus 25° C. to about 100° C.

8. The method of claim 7 wherein the contacting step is carried out at a temperature of from about 20° C. to about 90° C.

9. The method of claim 6 wherein the organic amine is selected from the group consisting of methylamines, ethylamines, propylamines and butylamines.

10. The method of claim 2 wherein the solvent is pyridine.

11. The method of claim 10 wherein the contacting step is carried out at a temperature of from about minus 5° C. to about 190° C.

12. The method of claim 11 wherein the contacting step is carried out at a temperature of from about 35° C. to about 125° C.

13. The method of claim 2 wherein the liquid medium is a substituted pyridine.

14. The method of claim 13 wherein the contacting step is carried out at a temperature of from about minus 5° C. to about 190° C.

15. The method of claim 14 wherein the contacting step is carried out at a temperature of from about 35° C. to about 165° C.

16. The method of claim 2 wherein the liquid medium is a mixture of ammonia and amines.

17. The method of claim 2 wherein the liquid medium is a mixture of ammonia and ethers.

18. The method of claim 2 wherein the liquid medium is an ether.

19. The method of claim 1 including the step of adding a catalyst to the $LiMn_2O_4$ or $\beta$-$MnO_2$ prior to step (b).

20. The method of claim 1 including the step of adding a catalyst to the $LiMn_2O_4$ or $\beta$-$MnO_2$ prior to step (c).

21. The method of claim 1 including the step of adding a catalyst to the $LiMn_2O_4$ or $\beta$-$MnO_2$, immediately prior to step (d).

22. The method of claim 1 including the step of adding a catalyst to the $LiMn_2O_4$ or $\beta$-$MnO_2$ immediately after step (d).

23. The method of claim 19 wherein the catalyst is selected from the group consisting of sulfur, sulfides, reducible sulfur compounds, iodine, iodides, reducible iodine compounds, pyridine, pyridine derivatives, and benzophenone.

24. The method of claim 20 wherein the catalyst is selected from the group consisting of sulfur, sulfides, reducible sulfur compounds, iodine, iodides, reducible iodine compounds, pyridine, pyridine derivatives, and benzophenone.

25. The method of claim 21 wherein the catalyst is selected from the group consisting of sulfur, sulfides, reducible sulfur compounds, iodine, iodides, reducible iodine compounds, pyridine, pyridine derivatives, and benzophenone.

26. The method of claim 22 wherein the catalyst is selected from the group consisting of sulfur, sulfides, reducible sulfur compounds, iodine, iodides, reducible iodine compounds, pyridine, pyridine derivatives, and benzophenone.

27. The method of claim 1 wherein the liquid medium is a solvent having an electron transfer catalyst dissolved therein.

28. The method of claim 27 wherein the liquid medium is a mixture of compounds which is a liquid at the reaction temperature.

29. The method of claim 27 wherein the catalyst is selected from the group consisting of sulfur, sulfides, reducible sulfur compounds, iodine, iodides, reducible iodine compounds, pyridine, pyridine derivatives, and benzophenone.

30. The method of claim 1 wherein x is about 0.3.

31. The method of claim 1 wherein x is about 0.6.

* * * * *